(12) United States Patent
Fujita et al.

(10) Patent No.: US 8,891,958 B2
(45) Date of Patent: Nov. 18, 2014

(54) TRANSMISSION QUALITY DETERMINATION METHOD, TRANSMISSION PATH SELECTION METHOD AND NETWORK MANAGEMENT SYSTEM

(75) Inventors: Takehiro Fujita, Kawasaki (JP); Shigeru Ishii, Kawasaki (JP); Takuya Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 374 days.

(21) Appl. No.: 13/396,940

(22) Filed: Feb. 15, 2012

(65) Prior Publication Data

US 2012/0230680 A1 Sep. 13, 2012

(30) Foreign Application Priority Data

Mar. 8, 2011 (JP) ................................ 2011-050825

(51) Int. Cl.
*H04B 10/08* (2006.01)
*H04J 14/02* (2006.01)
*H04B 10/079* (2013.01)

(52) U.S. Cl.
CPC .. *H04B 10/0793* (2013.01); *H04Q 2213/13345* (2013.01); *H04J 14/0227* (2013.01); *H04B 10/0795* (2013.01); *H04J 14/0278* (2013.01); *H04Q 2213/1301* (2013.01); *H04J 14/0271* (2013.01); *H04J 14/0267* (2013.01)
USPC ................... 398/29; 398/25; 398/28; 398/33; 398/38; 398/48; 398/79; 398/34

(58) Field of Classification Search
CPC ............. H04B 10/079; H04B 10/0791; H04B 10/0793; H04B 10/0795; H04B 10/07953; H04B 10/07955; H04B 10/07957
USPC ........... 398/25, 26, 27, 29, 33, 38, 45, 48, 49, 398/79, 28, 34, 81, 147, 158, 159, 152, 50, 398/57
See application file for complete search history.

(56) References Cited

U.S. PATENT DOCUMENTS

| | | | |
|---|---|---|---|
| 6,690,884 B1 * | 2/2004 | Kelty et al. ...................... | 398/27 |
| 7,630,635 B1 * | 12/2009 | Guy et al. ........................ | 398/49 |
| 7,715,721 B2 * | 5/2010 | Solheim et al. ................. | 398/97 |
| 2003/0009580 A1 | 1/2003 | Chen et al. | |

FOREIGN PATENT DOCUMENTS

| | | |
|---|---|---|
| JP | 2002-319970 | 10/2002 |
| JP | 2004-297502 | 10/2004 |
| JP | 2005-086521 | 3/2005 |

\* cited by examiner

*Primary Examiner* — Hanh Phan
(74) *Attorney, Agent, or Firm* — Staas & Halsey LLP

(57) ABSTRACT

There is provided a method of determining transmission quality of a path in an optical communication network system obtained by connecting a plurality of networks, the method including: acquiring a value representing transmission performance corresponding to a network condition of each of spans in the path in the optical communication network system; and determining the transmission quality of the path on the basis of the acquired value representing transmission performance corresponding to the network condition of each of spans.

12 Claims, 12 Drawing Sheets

FIG. 7A

| SIGNAL TYPE | FIBER TYPE | LOSS COEFFICIENT (dB/km) | DISPERSION COEFFICIENT (ps/nm/km) | DISPERSION SLOPE COEFFICIENT (ps/nm²/km) | PMD COEFFICIENT (ps/√km) | LOSS PER SPAN (dB) | DISTANCE PER SPAN (km) | NUMBER OF OADMs | MAXIMUM NUMBER OF SPANs |
|---|---|---|---|---|---|---|---|---|---|
| 10 Gbit/s | SSMF | 0.25 | 17.6 | 0.057 | 0.1 | 1 | 4 | 9 | 10 |
| | | | | | | 2 | 8 | 9 | 10 |
| | | | | | | ⋮ | ⋮ | ⋮ | ⋮ |
| | | | | | | 10 | 40 | 7 | 8 |
| | | | | | | ⋮ | ⋮ | ⋮ | ⋮ |
| | | | | | | 20 | 80 | 4 | 5 |
| | | | | | | 22 | 88 | 3 | 4 |
| | | | | | | ⋮ | ⋮ | ⋮ | ⋮ |
| | | | | | | 30 | 120 | 1 | 2 |
| | | | | | 0.5 | 1 | 4 | 8 | 9 |
| | | | | | | 2 | 8 | 7 | 8 |
| | | | | | | ⋮ | ⋮ | ⋮ | ⋮ |
| | | | | | | 10 | 40 | 5 | 6 |
| | | | | | | ⋮ | ⋮ | ⋮ | ⋮ |
| | | | | | | 30 | 120 | 1 | 2 |
| | | | | | ⋮ | ⋮ | ⋮ | ⋮ | ⋮ |

FIG. 7B

| SIGNAL TYPE | FIBER TYPE | LOSS COEFFICIENT (dB/km) | DISPERSION COEFFICIENT (ps/nm/km) | DISPERSION SLOPE COEFFICIENT (ps/nm²/km) | PMD COEFFICIENT (ps/√km) | LOSS PER SPAN (dB) | DISTANCE PER SPAN (km) | NUMBER OF OADMs | MAXIMUM NUMBER OF SPANs |
|---|---|---|---|---|---|---|---|---|---|
| 10 Gbit/s | SSMF | 0.1 | 17.6 | 0.057 | 0.1 | 1 | 4 | 11 | 12 |
| | | | | | | 2 | 8 | 11 | 12 |
| | | | | | | ⋮ | ⋮ | ⋮ | ⋮ |
| | | | | | | 10 | 40 | 8 | 9 |
| | | | | | | ⋮ | ⋮ | ⋮ | ⋮ |
| | | | | | | 20 | 80 | 4 | 5 |
| | | | | | | 22 | 88 | 4 | 5 |
| | | | | | | ⋮ | ⋮ | ⋮ | ⋮ |
| | | | | | | 30 | 120 | 2 | 3 |
| | | | | | 0.5 | 1 | 4 | 9 | 10 |
| | | | | | | 2 | 8 | 8 | 9 |
| | | | | | | ⋮ | ⋮ | ⋮ | ⋮ |
| | | | | | | 10 | 40 | 6 | 6 |
| | | | | | | ⋮ | ⋮ | ⋮ | ⋮ |
| | | | | | | 30 | 120 | 1 | 2 |
| ⋮ | | | | | ⋮ | ⋮ | ⋮ | ⋮ | ⋮ |

TRANSMISSION QUALITY DETERMINATION METHOD, TRANSMISSION PATH SELECTION METHOD AND NETWORK MANAGEMENT SYSTEM

CROSS-REFERENCE TO RELATED APPLICATION

This application is based upon and claims the benefit of priority of the prior Japanese Patent Application No. 2011-050825, filed on Mar. 8, 2011, the entire contents of which are incorporated herein by reference.

FIELD

The embodiment discussed herein is related to a transmission quality determination method, transmission path selection method and a network management system.

BACKGROUND

In order to perform transmission quality determination of whether desired transmission quality can be maintained when a signal is transmitted from a node to another node in an optical communication network, various pieces of information about the optical communication network are used. Here, transmission quality includes a bit error rate, a Q value, and a delay time.

The pieces of information used for transmission quality determination are as follows:
(1) The type, length, loss, chromatic dispersion coefficient, dispersion slope coefficient, and polarization mode dispersion coefficient of an optical fiber connecting nodes,
(2) The noise characteristic of an optical amplifier disposed at each node,
(3) Optical power input into a transmission path (optical fiber),
(4) The characteristic of a dispersion compensator disposed at each node,
(5) The characteristic of a transceiver,
(5-1) The bit rate and modulation method of a transmission signal,
(5-2) Optical Signal-to-Noise Ratio (OSNR) and error rate characteristics for chromatic dispersion and polarization mode dispersion,
(5-3) Error rate characteristic for the deterioration of a waveform caused by various nonlinear optical effects occurring in an optical fiber, and
(5-4) Error rate characteristic for the deterioration of an optical waveform passing through a wavelength add/drop filter at an Optical Add/Drop Multiplexer (OADM) node.

In order to accurately estimate transmission quality, transmission simulation is performed using these pieces of information. However, in the transmission simulation, it takes much time, for example, several days, to obtain a result of mathematical calculation. In addition, a calculating machine is used for the mathematical calculation.

Accordingly, instead of the transmission simulation, a method using a network design rule is often performed. The network design rule includes the database of the relationship between each of various combinations of parameters for network design and transmission quality. Using the database and a relatively simple mathematical expression, transmission quality is simply estimated.

Thus, a design procedure specified to estimate transmission quality without transmission simulation is called network design rule. That is, with the network design rule, it is possible to perform transmission quality determination of whether desired transmission quality of an optical signal transmitted from a node to another node can be maintained without performing transmission simulation.

A communication network has a network resource including at least one service domain. The service domain includes a user terminal and a controller for controlling the transmission of a data stream between the user terminal and a network node at predetermined service quality. Service quality depends on a Service Level Agreement (SLA) established between a user and the service domain. The service quality is processed by the controller and is converted into the set of policies to be employed. The policies include a policy for the selection and allocation of a network resource capable of transmitting a data stream at selected service quality. These techniques are disclosed in, for example, Japanese Laid-open Patent Publication No. 2002-319970.

At each of a plurality of points set in a design target section, a regenerative repeater or a linear repeater is disposed on the basis of the amounts of loss in a segment between a transmission terminal station and an adjacent point, a segment between two adjacent points, and a segment between a receiving terminal station and an adjacent point. In a 3R section, the amount of loss with which an optical signal transmitted from the transmission terminal station or the regenerative repeater disposed on the transmission side of the 3R section can be transmitted without being amplified by the linear repeater is calculated as a 1R target value. In the 3R section, the amounts of loss in segments are accumulated starting from the end on the transmission side to a direction apart from the transmission terminal station. The cumulative amount of loss and the 1R target value are compared. It is determined whether two segments are coupled to one segment without disposing a linear repeater on the basis of a result of the comparison. Thus, the linear repeater and the regenerative repeater are appropriately disposed. These techniques are disclosed in, for example, Japanese Laid-open Patent Publication No. 2004-297502.

A communication network is divided with nodes to obtain linear design sections, and the removal priority of regenerative repeaters at nodes at both ends of each of the design sections is stored. A linear repeater or a regenerative repeater is disposed at each node so that a signal can be transmitted in each design section and a higher margin of receiving signal quality is provided for a node having a high regenerative repeater removal priority. When a signal can be transmitted between two adjacent design sections without disposing a regenerative repeater at a boundary node, the regenerative repeater is removed. These techniques in a network design apparatus are disclosed in, for example, Japanese Laid-open Patent Publication No. 2005-86521.

The configuration of an optical communication network using an optical transmission apparatus is shifted from a point-to-point network configuration in the related art to a ring or mesh network configuration. FIG. 1 is a diagram illustrating the configuration of an example of a point-to-point network. FIG. 2 is a diagram illustrating the configuration of an example of a ring network. Referring to FIG. 1, nodes N1 to N4 are linearly connected to create a network.

In the ring network illustrated in FIG. 2, nodes N1 to N6 form a relatively small network NW1 and nodes N7 to N12 form a relatively small network NW2. These two networks are connected to each other via optical hub nodes N4 and N7. In such a relatively large ring or mesh network, different optical transmission systems are sometimes provided for networks. Different optical transmission systems are, for example, optical transmission systems created by different manufactures or optical transmission systems that are created by the same manufacture but are designed in accordance with different network design rules.

Referring to FIG. 2, it is assumed that the network NW1 including the nodes N1 to N6 is designed in accordance with a network design rule #1, and the network NW2 including the nodes N7 to N12 is designed in accordance with a network design rule #2. The nodes N4 and N7 are the same apparatus, and a single apparatus is called the node N4 in the network NW1 and the node N7 in the network NW2.

SUMMARY

According to an aspect of the embodiment, there is provided a method of determining transmission quality of a path in an optical communication network system obtained by connecting a plurality of networks, the method including: acquiring a value representing transmission performance corresponding to a network condition of each of spans in the path in the optical communication network system; and determining the transmission quality of the path on the basis of the acquired value representing transmission performance corresponding to the network condition of each of spans.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A and 7B are diagrams illustrating a transmission performance table according to an embodiment;

DESCRIPTION OF EMBODIMENT

Figure 1:
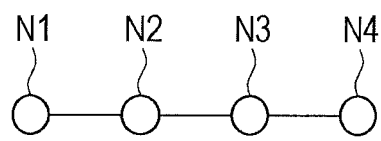
FIG. 1 is a diagram illustrating the configuration of an example of a point-to-point network.
Figure 2:
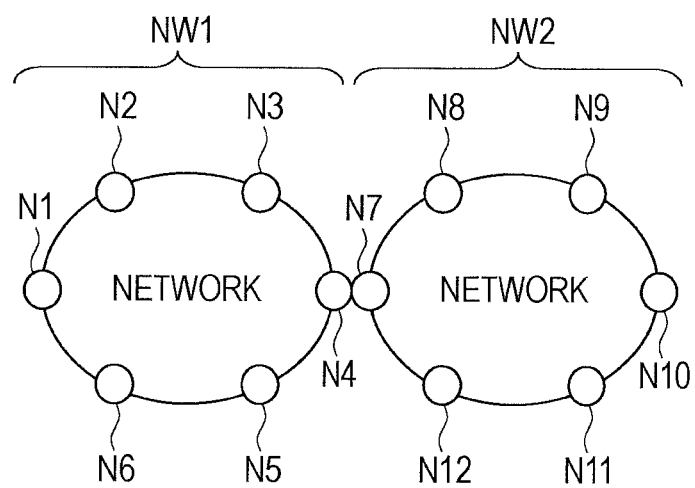
FIG. 2 is a diagram illustrating the configuration of an example of a ring network.
Figure 3:
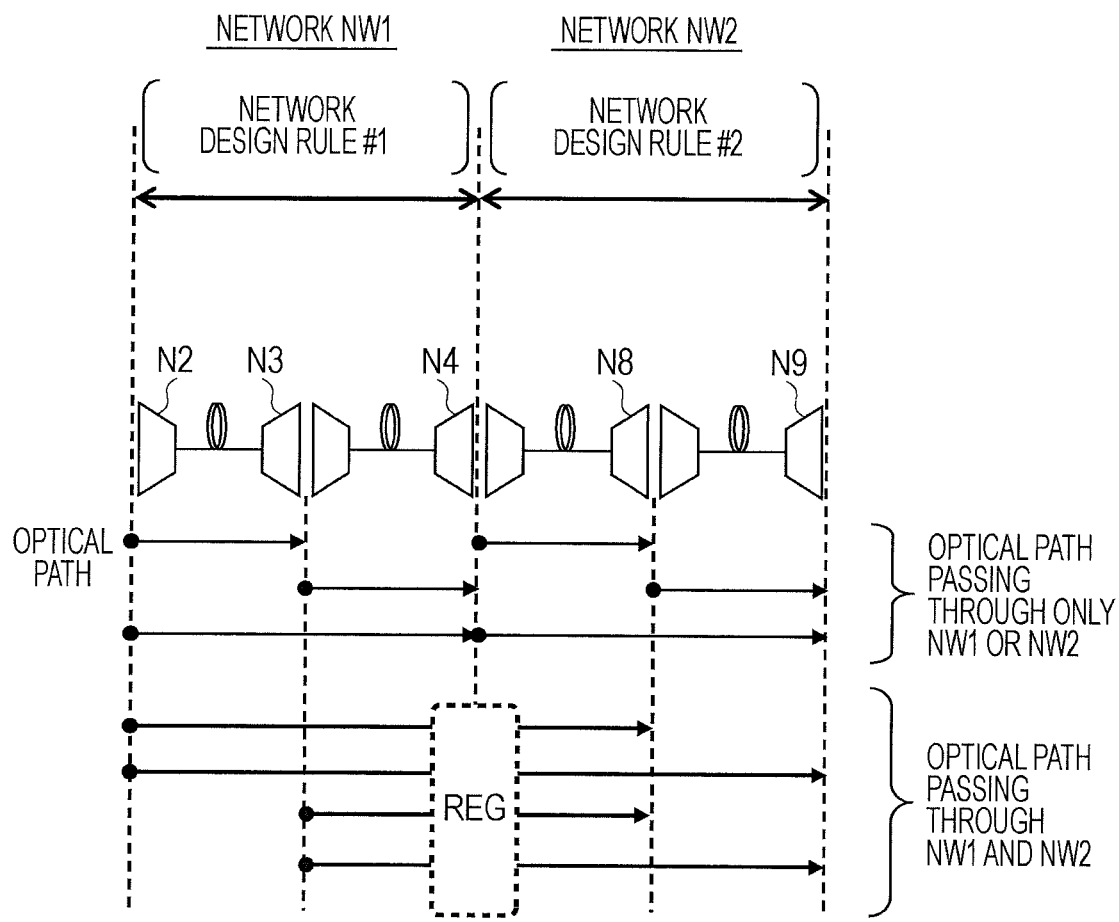
FIG. 3 is a diagram describing a problem that occurs at the boundary between networks.

As illustrated in FIG. 3, a regenerator (REG) for converting an optical signal into an electric signal and converting the electric signal into an optical signal is disposed at the node N4 (N7) that is the boundary between the networks. By disposing the regenerator, the mixture of networks designed in accordance with different network design rules does not occur from the viewpoint of an optical signal. However, the regenerator increases a cost.

In a ring or mesh network, a plurality of paths can be considered to transmit a signal from a certain add node to a certain drop node. In this case, it is desired that a low-cost path be selected. More specifically, it is desired that a path with which the number of regenerators can be reduced be selected.

However, the add node and the drop node may be included in networks designed in accordance with different network design rules. In this case, there was no other choice but to select a low-cost route having a small number of nodes in networks designed in accordance with the same network design rule. Accordingly, a low-cost route including a small number of regenerators may not necessarily be selected in an entire path.

Figure 4:
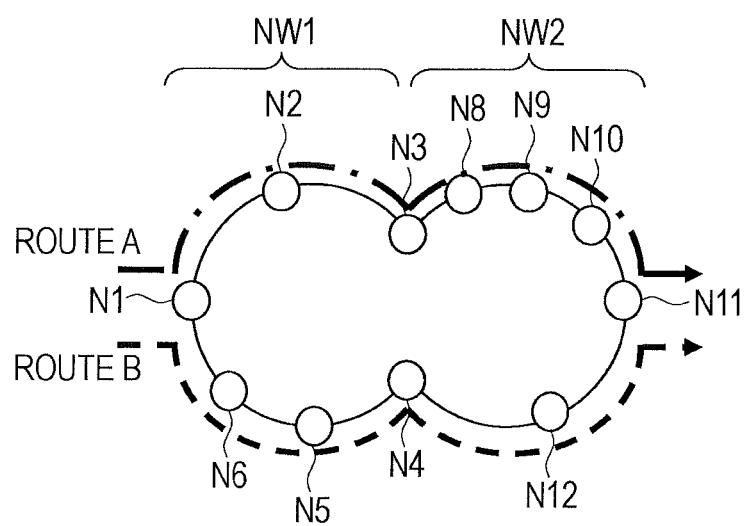
FIG. 4 is a diagram describing a problem that arises when a path is selected.

Referring to FIG. 4, the network NW1 including the nodes N1 to N6 is designed in accordance with the network design rule #1, and the network NW2 including the nodes N3, N4, N8 to N12 is designed in accordance with the network design rule #2.

The selection of a route from the add node N1 to the drop node N11 will be considered with reference to FIG. 4. As viewed from the add node N1, in the network NW1, a path passing through the nodes N1, N2, and N3 includes nodes the number of which is smaller than that included in a path passing through the nodes N1, N6, N5, and N4 and is superior to the path passing through the nodes N1, N6, N5, and N4 from the viewpoint of noise characteristic. However, in the network NW2, a path passing through the nodes N4, N12, N11 includes nodes the number of which is smaller than that included in a path passing through the nodes N3, N8, N9, N10, and N11 and is superior to the path passing through the nodes N3, N8, N9, N10, and N11 from the viewpoint of noise characteristic. In such a case, in the entire path from the add node to the drop node, a route B (passing through the nodes N1, N6, N5, N4, N12, and N11) is superior to a route A (passing through the nodes N1, N2, N3, N8, N9, N10, and N11) from the viewpoint of noise characteristic. Thus, since there has been no method of estimating the performance of an entire optical path, the selection of a path has not been appropriately performed.

An embodiment will be described below with reference to the accompanying drawings.

Configuration of Optical Communication Network System

Figure 5:
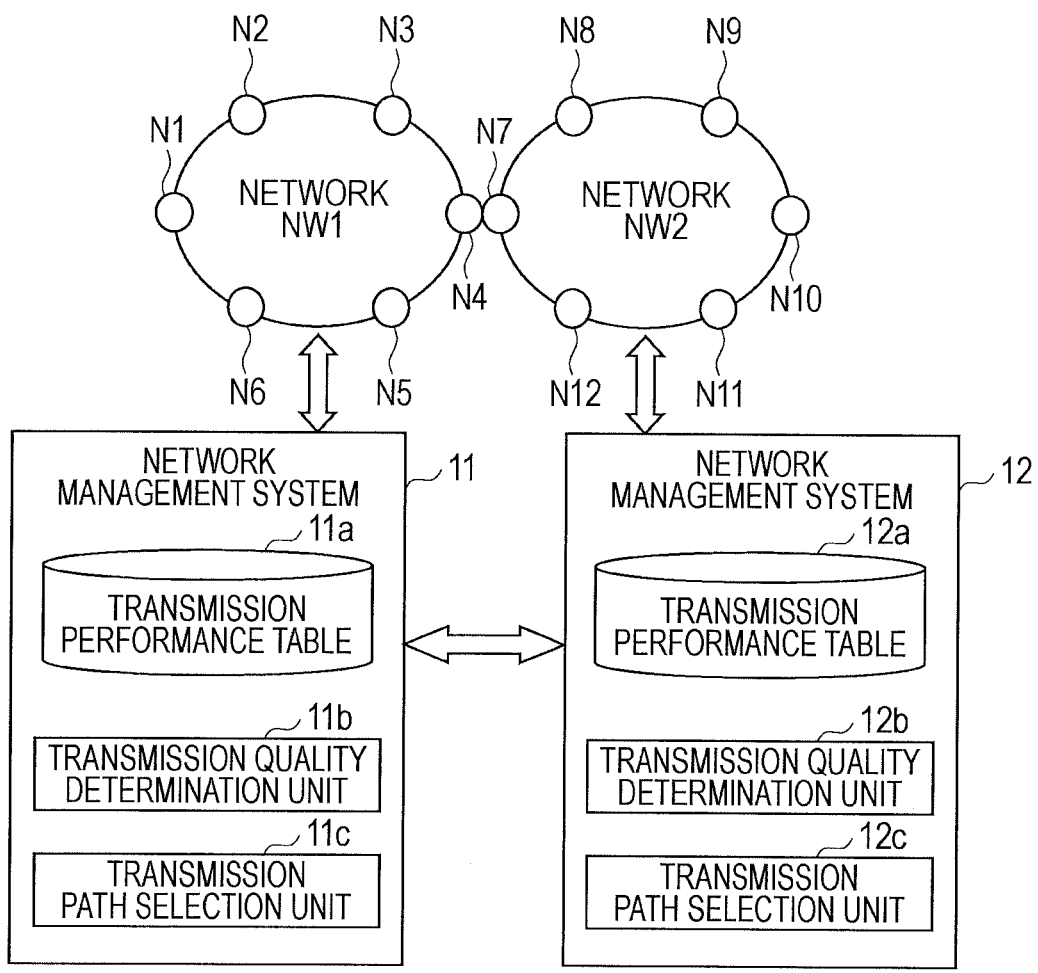
FIG. 5 is a diagram illustrating the configuration of an optical communication network system according to an embodiment.

FIG. 5 is a diagram illustrating the configuration of an optical communication network system according to an embodiment. In a ring network illustrated in FIG. 5, nodes N1 to N6 form a relatively small network NW1 and nodes N7 to N12 form a relatively small network NW2. These two networks are connected to each other via optical hub nodes N4 and N7. The nodes N4 and N7 are the same node, and a single apparatus functions as the node N4 in the network NW1 and the node N7 in the network NW2.

The network NW1 is designed in accordance with a network design rule #1, and the network NW2 is designed in accordance with a network design rule #2 different from the network design rule #1. A line connecting adjacent nodes is an optical fiber called span.

A network management system (NMS) 11 is connected to each of the nodes N1 to N6, or is connected to each of the nodes N1 to N6 via another node. The network management system 11 manages and controls the nodes N1 to N6 included in the network NW1, and includes a transmission performance table 11a, a transmission quality determination unit 11b, and a transmission path selection unit 11c.

A network management system 12 is connected to each of the nodes N7 to N12, or is connected to each of the nodes N7 to N12 via another node. The network management system 12 manages and controls the nodes N7 to N12 included in the network NW2, and includes a transmission performance table 12a, a transmission quality determination unit 12b, and a transmission path selection unit 12c.

Network Management System

Figure 6:
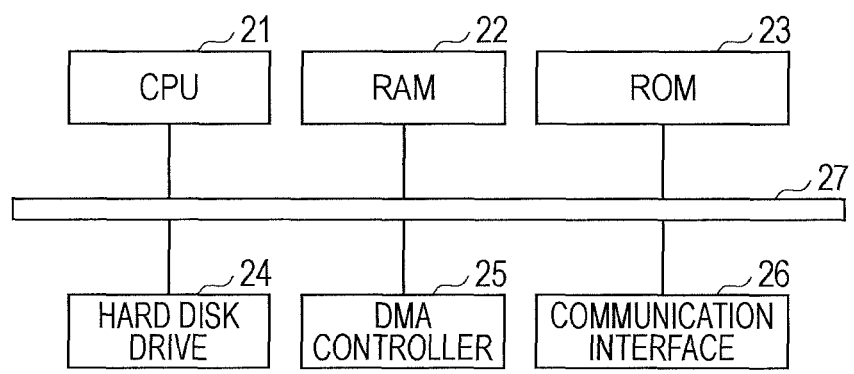
FIG. 6 is a diagram illustrating the hardware configuration of a network management system according to an embodiment.

FIG. 6 is a diagram illustrating the hardware configuration of the network management systems 11 and 12 according to an embodiment. Referring to FIG. 6, each of the network management systems includes a CPU 21, a RAM 22, a ROM 23, a hard disk drive 24, a DMA controller 25, and a communication interface 26 that are connected to one another via an internal bus 27.

The CPU 21 executes software stored in the RAM 22, the ROM 23, or the hard disk drive 24, so that various pieces of processing such as transmission quality determination processing, transmission path selection processing, management processing, and control processing are performed. The RAM 22 is used as a work area when various pieces of processing are performed. The hard disk drive 24 stores, for example, the optical fiber information of each span, and is used as a storage unit for storing the transmission performance tables 11a and 12a. The DMA controller 25 performs high-speed data transfer, for example, between the hard disk drive 24 and the communication interface 26. The communication interface 26 is connected to all or part of the nodes included in a network and communicates with the nodes. Furthermore, the communication interface 26 is connected to the communication interface 26 in an adjacent network management system, and communicates with the communication interface 26 in the adjacent network management system.

Transmission Performance Table

In this embodiment, the transmission performance table 11a stores a value representing transmission performance, that is, the maximum number of spans through which an optical signal can be transmitted (hereinafter referred to as the maximum number of transmissible spans) or the maximum transmission distance, defined by the network design rule #1 which is associated with each of various network conditions, and the transmission performance table 12a stores a value representing transmission performance, that is, the maximum number of transmissible spans or the maximum transmission distance, defined by the network design rule #2 which is associated with each of various network conditions. It is determined whether an optical path extending over two or more networks designed in accordance with the different network design rules #1 and #2 can transmit an optical signal with the maximum number of transmissible spans. Instead of the maximum number of transmissible spans or the maximum transmission distance, the inverse of the maximum number of transmissible spans or the maximum transmission distance may be used as a value representing transmission performance. The maximum number of transmissible spans in a virtual network in which the same parameter is set for all spans each connecting nodes is prepared as numeric data and is stored in the transmission performance tables 11a and 12a.

FIG. 7A is a diagram illustrating the transmission performance table 11a according to an embodiment, and FIG. 7B is a diagram illustrating the transmission performance table 12a according to an embodiment. Span parameters are as follows:

(1) The type, that is, bit rate and/or modulation method of a transmission signal,
(2) The type of an optical fiber (for example, Standard Single Mode Fiber (SSMF) specified by ITU-T G.652 or Non Zero Dispersion Fiber (NZ-DSF) specified by ITU-T G.655),
(3) A loss coefficient for an optical fiber (dB/km),
(4) A chromatic dispersion coefficient for an optical fiber (ps/nm/km),
(5) A chromatic dispersion slope coefficient for an optical fiber (ps/nm$^2$/km),
(6) A polarization mode dispersion (PMD) coefficient for an optical fiber (ps/√km),
(7) A fiber loss per span (dB),
(8) A distance per span (km), and
(9) The number of Optical Add/Drop Multiplexers (OADMs) included in a path.

In the transmission performance tables 11a and 12a, the maximum number of spans is set in advance with which desired transmission quality can be maintained without disposing a regenerator when the above-described parameters (1) to (9) are set in accordance with a network design rule or with an alternative method such as an optical transmission simulation.

Figure 8:
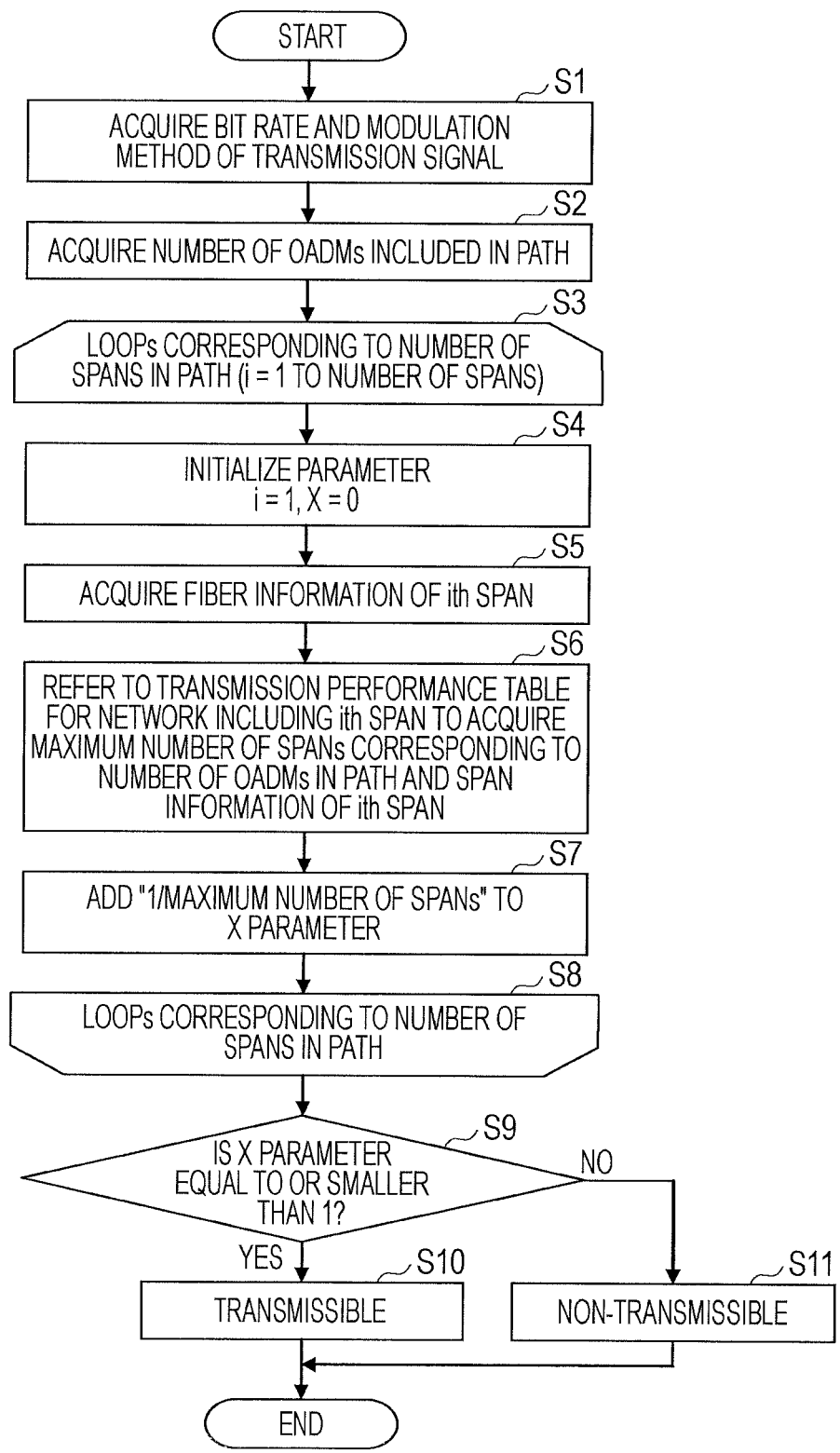
FIG. 8 is a flowchart illustrating a transmission quality determination process performed by a network management system according to an embodiment.

Among the above-described parameters (1) to (9), the parameters (1), (2), (6), and (7) are most important. The parameters (4) and (5) are next important. By adding other parameters, the design accuracy can be increased. Process Performed by Transmission Quality Determination Unit FIG. 8 is a flowchart illustrating a transmission quality determination process performed by the transmission quality determination unit 11b or 12b in the network management system 11 or 12 according to an embodiment. After a path (or a path candidate) from a start node at which a signal is added to an end node at which the signal is dropped has been determined, this process is performed by a network management system for a network (for example, the network NW1) including the start node.

Referring to FIG. 8, in operation S1, the bit rate and/or modulation method of a signal to be transmitted through a path are acquired. In operation S2, the number of OADMs included in the path is acquired. The process from operations S3 to S8 is a loop process repeated a plurality of times corresponding to the number of spans included in the path (i=1 to the number of spans).

In operation S4, a parameter is initialized by setting i=1 and X=0. In operation S5, the optical fiber information of an ith span in the path is acquired. The optical fiber information of each span is stored in advance in, for example, the hard disk drive 24 in a network management system. In operation S6, the transmission performance table 11a or 12a is searched for the maximum number of spans corresponding to the optical fiber information of the ith span and the number of OADMs included in the path. In operation S7, the inverse of the acquired maximum number of spans (1/the maximum number of spans) is added to an X parameter.

In a case where the transmission quality determination unit 11b in the network management system 11 performs the process illustrated in FIG. 8 and the ith span in the path is included in the network NW2, the transmission quality determination unit 11b accesses the transmission performance table 12a in the network management system 12 via the communication interface 26 and searches the transmission performance table 12a for the maximum number of spans corresponding to the optical fiber information of the ith span and the number of OADMs included in the path.

The process from operations S3 to S8 is repeated a plurality of times corresponding to the number of spans included in the path. When it is assumed that the number of spans in the path is n, the X parameter is represented by equation (1).

$$X = (1/\text{the maximum number of spans in the case of a first span}) + (1/\text{the maximum number of spans in the case of a second span}) + \ldots + (1/\text{the maximum number of spans in the case of an nth span}) \quad (1)$$

In operation S9, it is determined whether the X parameter is equal to or smaller than 1. When it is determined in operation S9 that X≤1.0 is satisfied, desired transmission quality of the path can be maintained without disposing a regenerator. Accordingly, in operation S10, the transmission quality determination that the path can transmit an optical signal is performed. Subsequently, the process ends.

On the other hand, when it is determined in operation S9 that X>1.0 is satisfied, it is impossible to maintain desired transmission quality of the path. Accordingly, in operation S11, transmission quality determination that the path can transmit no optical signal is performed. Subsequently, the process ends. When the transmission quality determination that the path can transmit no optical signal is performed, at least one regenerator is disposed in the path.

Thus, even in the case of a path extending over a plurality of networks designed in accordance with different network design rules, it is possible to accurately determine whether the path can transmit an optical signal.

Figure 9:
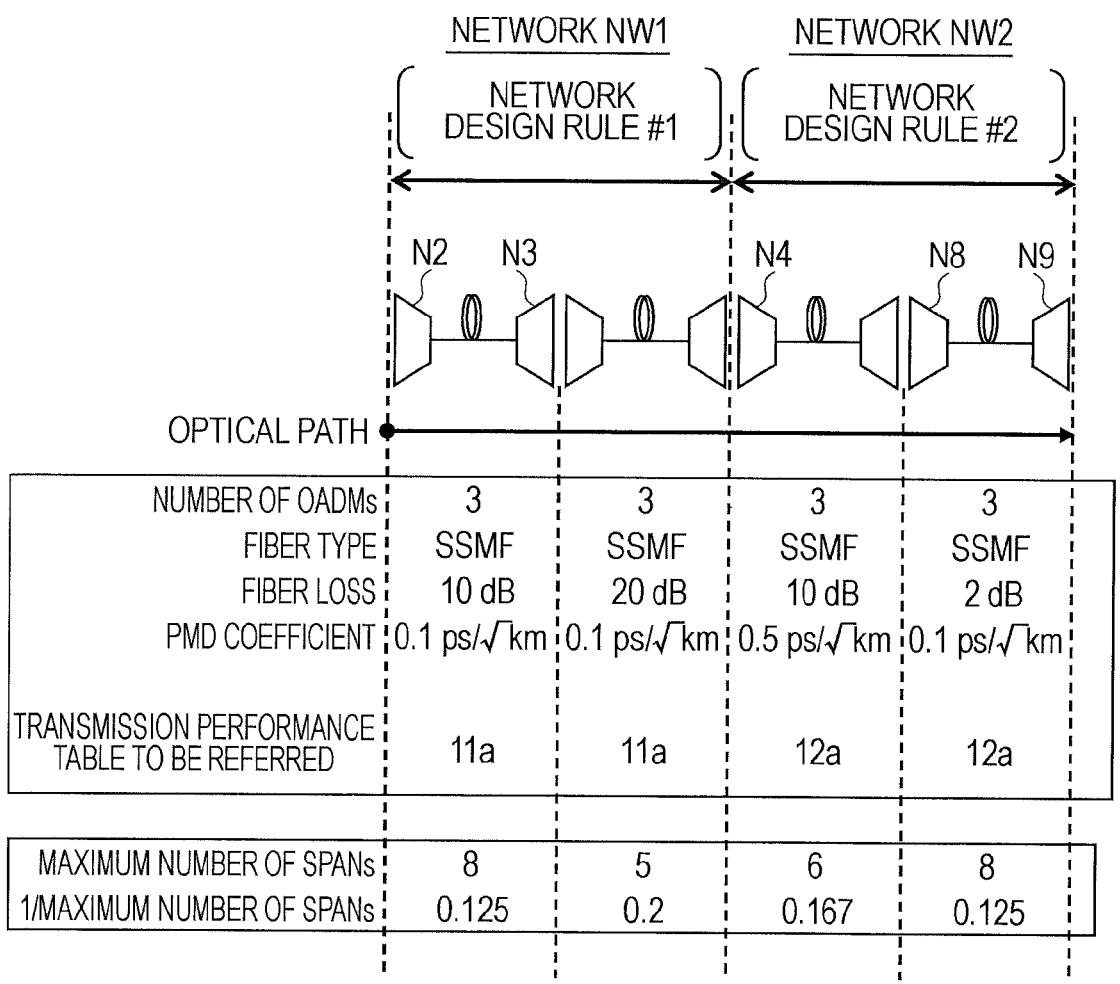
FIG. 9 is a diagram describing the determination of transmission quality of a path extending over networks.

As illustrated in FIG. 9, a case where a signal added at the node N2 in the network NW1 is dropped at the node N9 in the network NW2, that is, a case where the transmission quality of a path extending over networks and passing through the nodes N2, N3, N4, N8, and N9 is determined, will be described. It is assumed that the nodes N4 and N7 are the same apparatus and the nodes N3, N4, and N8 are OADMs.

The optical fiber information of a span N2-N3 includes the fiber type of SSMF, the fiber loss of 10 dB, the PMD coefficient of 0.1 ps/√km, the transmission performance table 11a to be referred, and three OADMs included in a path. Accordingly, the maximum number of spans in the case of the span N2-N3 is 8, and the inverse of the maximum number of spans is 0.125. The inverse of the maximum number of spans in the case of a span N3-N4 is 0.2, the inverse of the maximum number of spans in the case of a span N4-N8 is 0.1672, and the inverse of the maximum number of spans in the case of a span N8-N9 is 0.125. Accordingly, since the sum X of the inverses of the maximum numbers of spans is 0.617 and 0.617≤1.0 is satisfied, it is determined that desired transmission quality of the path (passing through the nodes N2, N3, N4, N8, and N9) can be maintained without disposing a regenerator and the path can transmit an optical signal. Thus, the determination whether an optical path can maintain predetermined transmission quality can be performed with an optical signal.

Modification of Optical Communication Network System

Figure 10:
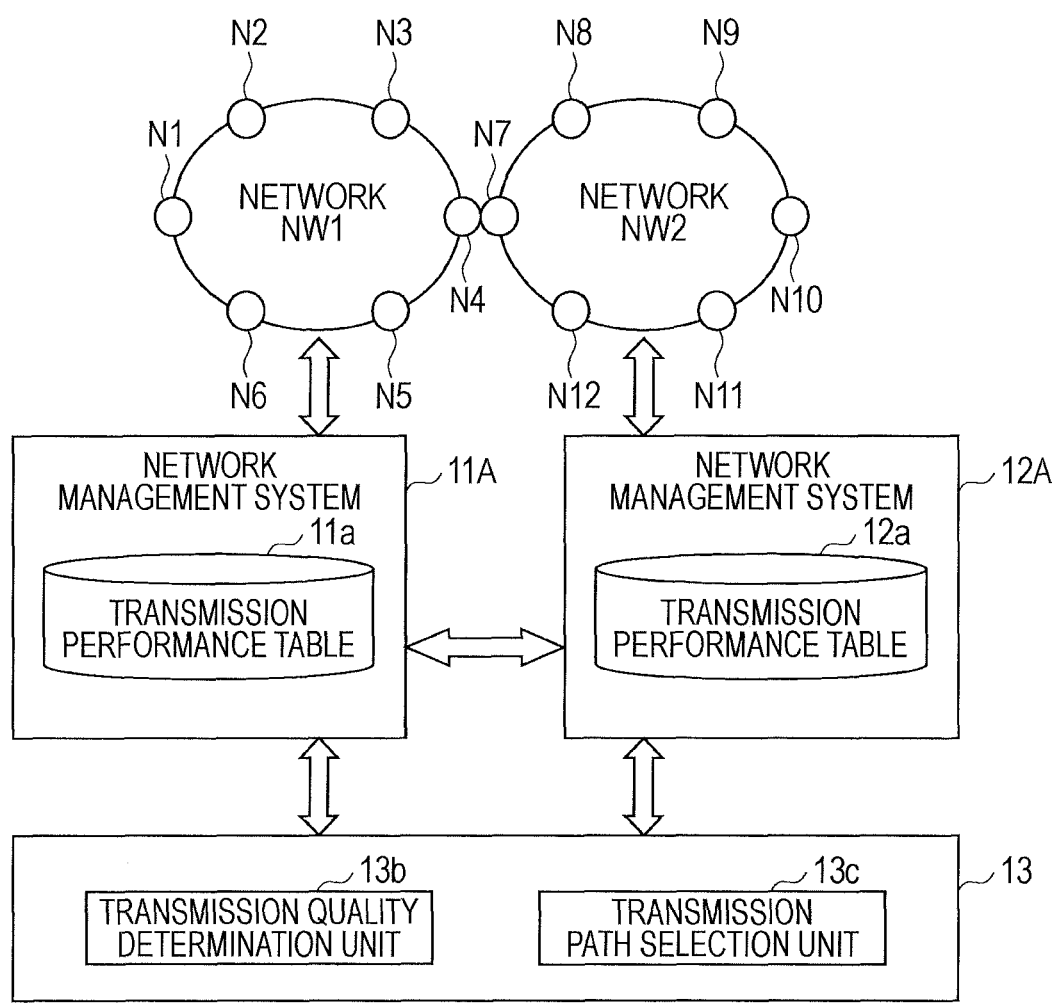
FIG. 10 is a diagram illustrating the configuration of a modification of an optical communication network system according to an embodiment.

FIG. 10 is a diagram illustrating the configuration of a modification of an optical communication network system according to an embodiment. Referring to FIG. 9, the same reference numerals are used to identify parts already described with reference to FIG. 5, and the description thereof will be therefore omitted.

A network management system 11A is Connected to each of the nodes N1 to N6, or is connected to each of the nodes N1 to N6 via another node. The network management system 11A manages and controls the nodes N1 to N6 in the network NW1, and includes the transmission performance table 11a. The network management system 11A differs from the network management system 11 illustrated in FIG. 5 in that the network management system 11A does not include the transmission quality determination unit 11b and the transmission path selection unit 11c.

A network management system 12A is connected to each of the nodes N7 to N12, or is connected to each of the nodes N7 to N12 via another node. The network management system 12A manages and controls the nodes N7 to N12 in the network NW2, and includes the transmission performance table 12a. The network management system 12A differs from the network management system 12 illustrated in FIG. 5 in that the network management system 12A does not include the transmission quality determination unit 12b and the transmission path selection unit 12c.

A transmission quality and transmission path management apparatus 13 has a hardware configuration similar to that illustrated in FIG. 6, is connected to the network management systems 11A and 12A via communication interfaces, and includes a transmission quality determination unit 13b and a transmission path selection unit 13c.

Process Performed by Transmission Quality Determination Unit

Figure 11:
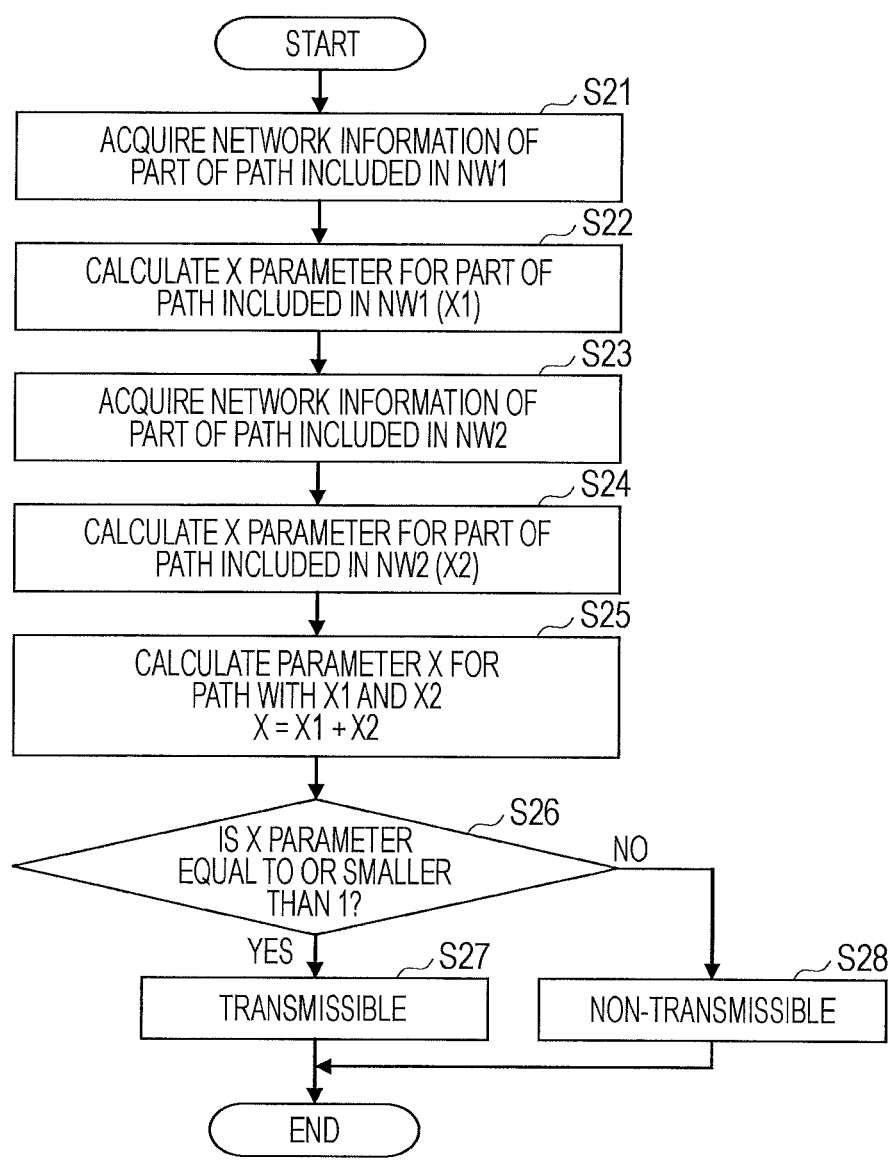
FIG. 11 is a flowchart illustrating a transmission quality determination process performed by a transmission quality and transmission path management apparatus according to an embodiment.

FIG. 11 is a flowchart illustrating a transmission quality determination process performed by the transmission quality determination unit 13b in the transmission quality and transmission path management apparatus 13 according to an embodiment. After a path (or a path candidate) from a starting point at which a signal is added to an end node at which the signal is dropped has been determined, this process is performed by the transmission quality determination unit 13b in the transmission quality and transmission path management apparatus 13.

Referring to FIG. 11, in operation S21, the transmission quality determination unit 13b acquires, from the network management system 11A, optical fiber information of a span in the path which is included in the network NW1. In operation S22, the transmission quality determination unit 13b searches the transmission performance table 11a for the maximum number of spans corresponding to the optical fiber information of the span included in the network NW1 and the number of OADMs included in the path. The transmission quality determination unit 13b adds the inverses (1/the maximum numbers of spans) of the acquired maximum numbers of spans corresponding to spans included in the network NW1 to calculate an X1 parameter for the spans.

In operation S23, the transmission quality determination unit 13b acquires, from the network management system 12A, optical fiber information of a span in the path which is included in the network NW2. In operation S24, the transmission quality determination unit 13b searches the transmission performance table 12a for the maximum number of spans corresponding to the optical fiber information of the span included in the network NW2 and the number of OADMs included in the path. The transmission quality determination unit 13b adds the inverses (1/the maximum numbers of spans) of the acquired maximum numbers of spans corresponding to spans included in the network NW2 to calculate an X2 parameter for the spans.

In operation S25, the transmission quality determination unit 13b adds the X1 and X2 parameters to obtain the X parameter (X=X1+X2). In operation S26, it is determined whether the X parameter is equal to or smaller than 1. When it is determined in operation S26 that X≤1.0 is satisfied, desired transmission quality of the path can be maintained without disposing a regenerator. Accordingly, in operation S27, the transmission quality determination that the path can transmit an optical signal is performed. Subsequently, the process ends.

On the other hand, when it is determined in operation S26 that X>1.0 is satisfied, it is impossible to maintain desired transmission quality of the path. Accordingly, in operation S28, the transmission quality determination that the path can transmit no optical signal is performed. Subsequently, the process ends.

Referring to FIG. 10, the network management systems 11A and 12A include the transmission performance tables 11a and 12a, respectively. The transmission performance tables 11a and 12a may be transferred to or included in the transmission quality and transmission path management apparatus 13.

Figure 12:
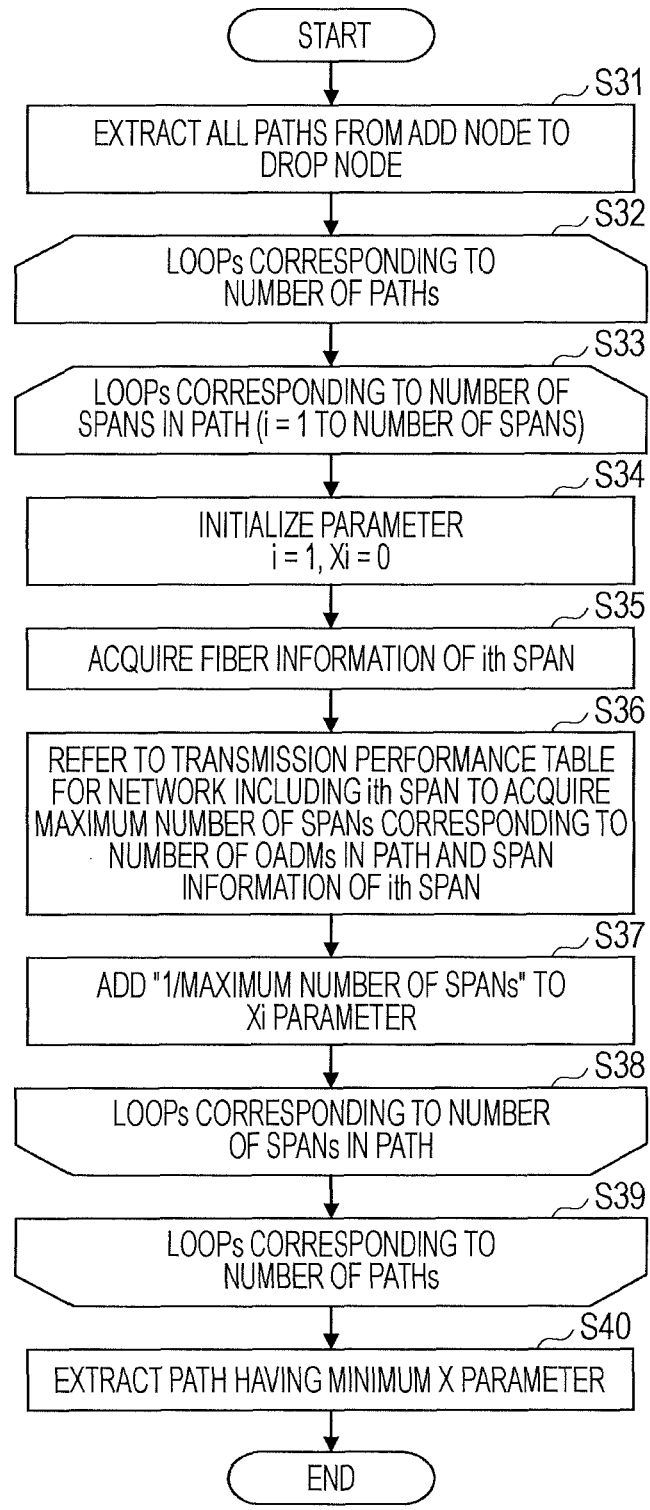
FIG. 12 is a flowchart illustrating a transmission path selection process according to an embodiment.

Transmission Path Selection Process Performed by Transmission Path Selection Unit FIG. 12 is a flowchart illustrating a transmission path selection process performed by the transmission path selection unit 11c, 12c, or 13c according to an embodiment. This process is performed by the network management system 11 or 12 or the transmission quality and transmission path management apparatus 13 for which a start node at which a signal is added and an end node at which the signal is dropped have been set.

Referring to FIG. 12, in operation S31, all paths from the start node (add node) to the end node (drop node) are extracted as path candidates. The process from operations S32 to S39 is a loop process repeated a plurality of times corresponding to the number of path candidates. The process from operations S33 to S38 included in the above-described loop process (S32 to S39) is a loop process repeated a plurality of times corresponding to the number of spans included in a single path candidate (i=1 to the number of spans). It is assumed that, in the loop process from operations S33 to S38, the bit rate and modulation method of a signal to be transmitted through a path candidate and the number of OADMs included in the path candidate have already been acquired.

In operation S34, a parameter is initialized by setting i=1 and Xi=0. In operation S35, the optical fiber information of an ith span in the path candidate is acquired. In operation S36, the transmission performance table 11a or 12a is searched for the maximum number of spans corresponding to the optical fiber information of the ith span and the number of OADMs included in the path candidate. In operation S37, the inverse of the acquired maximum number of spans (1/the maximum number of spans) is added to the Xi parameter.

The process from operations S33 to S38 is repeated a plurality of times corresponding to the number of spans included in the path candidate. The Xi parameter is represented by equation (2) where the number of spans in the path candidate is n.

$$Xi = (1/\text{the maximum number of spans in the case of a first span}) + (1/\text{the maximum number of spans in the case of a second span}) + \ldots + (1/\text{the maximum number of spans in the case of an nth span}) \quad (2)$$

The loop process from operations S32 to S39 is performed for all of the path candidates. When the number of path candidates is m, X parameters (X1 to Xm) are calculated. In operation S40, one of the path candidates having the minimum X parameter is selected as a path to be set. Subsequently, the process ends.

In a network in which a plurality of networks designed in accordance with different network design rules are mixed, a low-cost path including no regenerator and having a good noise characteristic can be accurately selected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of determining transmission quality of a path in an optical communication network system obtained by connecting a plurality of networks, the method comprising:
   acquiring a value representing transmission performance corresponding to a network condition of each of spans in the path in the optical communication network system; and
   determining the transmission quality of the path on the basis of the acquired value representing transmission performance corresponding to the network condition of each of spans.

2. The method according to claim 1,
   wherein the network conditions include a type of a transmission signal, a type of an optical fiber, a polarization mode dispersion coefficient for the optical fiber, and a fiber loss per span,
   wherein one of a maximum number of transmissible spans, a maximum transmission distance, an inverse of the maximum number of transmissible spans, and an inverse of the maximum transmission distance is used as the value representing transmission performance.

3. The method according to claim 2, wherein the transmission quality of the path is determined by comparing, with 1, a sum of the inverses of the maximum numbers of spans or a sum of the inverses of the maximum transmission distances, the maximum numbers of spans and the maximum transmission distances having been acquired for paths.

4. A method of selecting a single path connecting a start node and an end node specified in an optical communication network system obtained by connecting a plurality of networks, the method comprising:
   extracting all paths connecting the start node and the end node;
   acquiring a value representing transmission performance corresponding to a network condition of each of spans in each of the extracted paths;
   obtaining values representing transmission qualities of the extracted paths on the basis of the value representing transmission performance acquired for each of spans in each of the extracted paths; and
   selecting the single path on the basis of comparison of the values representing transmission qualities of the extracted paths.

5. The transmission path selection method according to claim 4,
   wherein the network conditions include a type of a transmission signal, a type of an optical fiber, a polarization mode dispersion coefficient for the optical fiber, and a fiber loss per span,
   wherein one of a maximum number of transmissible spans, a maximum transmission distance, an inverse of the maximum number of transmissible spans, and an inverse of the maximum transmission distance is used as the value representing transmission performance.

6. The transmission path selection method according to claim 5, wherein each of the values representing transmission qualities of the extracted paths is a sum of the inverses of the maximum numbers of spans or a sum of the inverses of the maximum transmission distances, the maximum numbers of spans and the maximum transmission distances having been acquired for paths.

7. A network management system for determining transmission quality of a path in an optical communication network system obtained by connecting a plurality of networks, the network management system comprising:
- a memory in which values representing transmission performance obtained under network conditions are stored, for each of the plurality of networks; and
- a processor configured to execute a procedure, the procedure comprising:
  - acquiring, from the memory for each of spans in the path in the optical communication network system, a value representing transmission performance corresponding to a network condition of each of spans; and
  - determining the transmission quality of the path on the basis of the acquired value representing transmission performance corresponding to the network condition of each of spans.

8. The network management system according to claim 7, wherein the network conditions include a type of a transmission signal, a type of an optical fiber, a polarization mode dispersion coefficient for the optical fiber, and a fiber loss per span, wherein one of a maximum number of transmissible spans, a maximum transmission distance, an inverse of the maximum number of transmissible spans, and an inverse of the maximum transmission distance is used as the value representing transmission performance.

9. The network management system according to claim 8, wherein the transmission quality of the path is determined by comparing, with 1, a sum of the inverses of the maximum numbers of spans or a sum of the inverses of the maximum transmission distances, the maximum numbers of spans and the maximum transmission distances having been acquired for paths.

10. A network management system for selecting a single path connecting a start node and an end node specified in an optical communication network system obtained by connecting a plurality of networks, the network management system comprising:
- a memory in which values representing transmission performance obtained under network conditions are stored, for each of the plurality of networks; and
- a processor configured to execute a procedure, the procedure comprising:
  - extracting all paths connecting the start node and the end node;
  - acquiring, from the memory for each of spans in each of the extracted paths, a value representing transmission performance corresponding to a network condition of each of spans;
  - obtaining values representing transmission qualities of the extracted paths on the basis of the value representing transmission performance acquired for each of spans in each of the extracted paths; and
  - selecting the single path by comparing the values representing transmission qualities of the extracted paths.

11. The network management system according to claim 10, wherein the network conditions include a type of a transmission signal, a type of an optical fiber, a polarization mode dispersion coefficient for the optical fiber, and a fiber loss per span, wherein one of a maximum number of transmissible spans, a maximum transmission distance, an inverse of the maximum number of transmissible spans, and an inverse of the maximum transmission distance is used as the value representing transmission performance.

12. The network management system according to claim 11, wherein each of the values representing transmission qualities of the extracted paths is a sum of the inverses of the maximum numbers of spans or a sum of the inverses of the maximum transmission distances, the maximum numbers of spans and the maximum transmission distances having been acquired for paths.

* * * * *